(12) United States Patent
Faubel et al.

(10) Patent No.: US 8,217,984 B2
(45) Date of Patent: Jul. 10, 2012

(54) VIDEOCONFERENCING NETWORK ADAPTER DETECTION USING STUN PROTOCOL

(75) Inventors: Kenneth T. Faubel, Dunstable, MA (US); Jonathan P. Steer, Nashua, NH (US)

(73) Assignee: Polycom, Inc., Pleasanton, CA (US)

( * ) Notice: Subject to any disclaimer, the term of this patent is extended or adjusted under 35 U.S.C. 154(b) by 1260 days.

(21) Appl. No.: 11/940,979

(22) Filed: Nov. 15, 2007

(65) Prior Publication Data

US 2008/0129817 A1    Jun. 5, 2008

Related U.S. Application Data

(60) Provisional application No. 60/865,945, filed on Nov. 15, 2006.

(51) Int. Cl.
   *H04N 7/14* (2006.01)
(52) U.S. Cl. ............. 348/14.08; 348/14.01; 348/14.09
(58) Field of Classification Search .... 348/14.01–14.02, 348/14.05, 14.08–14.09; 709/204, 223; 370/260, 370/352
   See application file for complete search history.

(56) References Cited

U.S. PATENT DOCUMENTS 7,706,373 B2 *   4/2010   Xu et al. ................. 370/352
7,908,480 B2 *   3/2011   Firestone et al. ......... 709/223

OTHER PUBLICATIONS

Rosenberg, J., et al., STUN—Simple Traversal of User Datagram Protocol (UDP) Through Network Address Translators (NATs), Network Working Group Memo, Mar. 2003, 48 pgs.
O'Neil, Timothy M., "Demystifying IP Migration for IT Professionals", Polycom, Inc., May 2005, 15 pgs.
"Overcoming Secure Visual Communication Obstacles with TANDBERG Expressway™", TANDBERG White Paper, date unknown, 8 pgs.
"Delivering on the Promise of Easy to Use, Secure, and Inexpensive Video Conferencing in an IP Environment", Frost & Sullivan, date unknown, 16 pgs.
Luff, Ed, "SIP Firewall Traversal & Security", IEEE Security Workshop, date unknown, 21 pgs.

* cited by examiner

*Primary Examiner* — Suhan Ni
(74) *Attorney, Agent, or Firm* — Wong, Cabello, Lutsch, Rutherford & Brucculeri, LLP

(57) ABSTRACT

A network adapter detection is used to establish a videoconference between a videoconferencing unit and a remote endpoint. Information about a plurality of network adapters available for the videoconferencing application is obtained, and one or more test messages are sent to at least one open source server using each of one or more of the obtained network adapters. The videoconferencing unit than awaits a response to each of the one or more sent test messages from the at least one open source server. If a response is received, the videoconferencing application uses the network adapter that received the response to establish a videoconference connection with the remote endpoint.

25 Claims, 3 Drawing Sheets

VIDEOCONFERENCING NETWORK ADAPTER DETECTION USING STUN PROTOCOL

CROSS-REFERENCE TO RELATED APPLICATIONS

This is a non-provisional application of U.S. Provisional Application Ser. No. 60/865,945, filed 15 Nov. 2006, which is incorporated herein by reference and to which priority is claimed.

FIELD OF THE DISCLOSURE

The subject matter of the present disclosure relates to a system and method of network adapter detection using STUN protocol for videoconferencing.

BACKGROUND OF THE DISCLOSURE

In a network environment, applications operating on a computer or other network device can use different types of network adapters to connect with a network. Some examples of network adapters include wired Ethernet, wireless Ethernet, Ethernet over video, Ethernet over Firewire (IEEE 1394), infrared links, and other adapters known and used in the art. The hardware for the network adapter can be a Periperhal Component Interconnect (PCI) Ethernet card, Personal Computer Memory Card International Association (PCMCIA) device, or Universal Serial Bus (USB) device.

In most cases, which network adapter is actually used by an application (e.g., a web browser, an e-mail application, etc.) may not be particularly relevant for that application. However, the requirements and data exchange involved in videoconferencing bring greater importance to which network adapter is used. For example, in videoconferencing, multimedia is communicated between a videoconferencing application and a remote endpoint. Typically, users must manually chose which network adapter to use for videoconferencing and must configure a proper firewall port to use. Operating systems may offer a preferred order of network adapters from which the user can select for videoconferencing. However, these network adapters can appear valid to the operating system even through a given adapter is incapable of establishing connectivity to a network or the given adapter is incapable of reaching a desired videoconferencing service.

One form of videoconferencing known in the art is desktop videoconferencing, which is computer-based. One example of a product for desktop videoconferencing is the ViaVideo® product available from Polycom, Inc. of Pleasanton, Calif. The ViaVideo® product includes a desktop videoconferencing application for a computer and a unit having a camera, an imbedded microphone, and a multimedia processor for connecting to the computer. To support desktop videoconferencing, the computer uses the videoconferencing application for sending and receiving video and audio from and to the desktop environment. The user calls an Internet Protocol (IP) address of a remote endpoint using the videoconferencing application on the computer. Then, a network adapter on the computer connects to a network to subsequently connect with the remote endpoint. A number of security barriers (e.g., firewalls, Network Address Translators (NATs), etc.) and various types of networks (e.g., Local Area Networks, Internet, etc.) may be used in the videoconferencing connection.

In some network environments, the security barriers can prevent or hinder proper videoconferencing connections. In some network environments that use Virtual Private Network (VPN) or the like, IP addresses from a pool of available address are assigned to devices every time they connect to a network, which can be problematic for desktop videoconferencing applications.

The subject matter of the present disclosure is directed to overcoming, or at least reducing the effects of, one or more of the problems set forth above.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
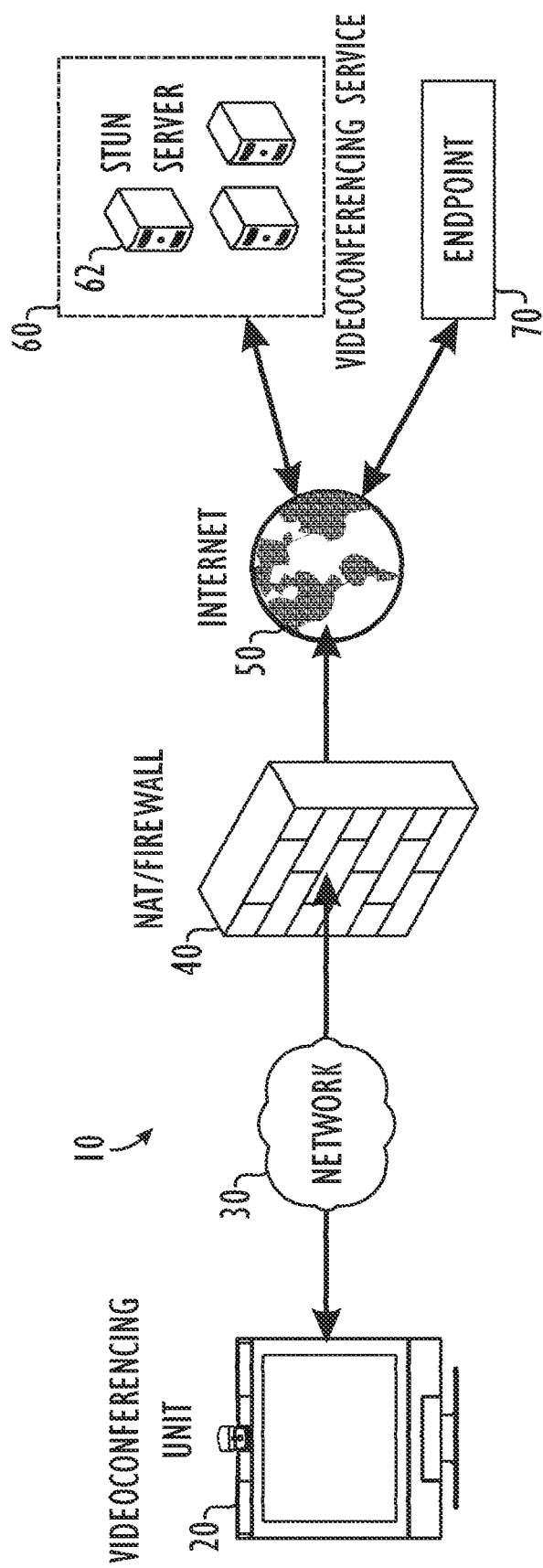
FIG. 1 illustrates one embodiment of a network adapter detection system according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, one embodiment of a network adapter detection system 10 according to certain teachings of the present disclosure is illustrated. The system 10 includes a videoconferencing unit 20, a videoconferencing service 60, and a remote endpoint 70. The videoconferencing unit 20 is part of a local network or intranet 30, which can include a number of different components. For example, the local network 30 may be part of an enterprise computing environment having a number of servers, computers, videoconferencing devices, routers, and the like. The videoconferencing unit 20 can be a stand-alone unit used for videoconferencing, a desktop computer configured for videoconferencing, or other device used in videoconferencing. The remote endpoint 70 can be another stand-alone unit used for videoconferencing, a desktop computer configured for videoconferencing, or other device used in videoconferencing. The videoconferencing service 60 can have a plurality of servers, routers, gateways, multipoint control units, etc. for providing videoconferencing services. Various network devices, such as routers, servers, and others (not shown) are used between the videoconferencing unit 20, the video conferencing service 60, and the endpoint 70.

The videoconferencing unit 20 is separated from the videoconferencing service 60 and the endpoint 70 by a Network Address Translator (NAT)/Firewall arrangement 40 positioned between the local network or intranet 30 and the Internet 50. One purpose of the NAT/Firewall arrangement 40 is to provide security for the local network 30. The Network Address Translators (NATs) of the arrangement 40, which can include routers, act as agents between the Internet 50 and the local network 30 associated with the videoconferencing unit 20 and map traffic coming into and leaving the local network 30. Other NATs and Firewalls may be present elsewhere between the videoconferencing unit 20, the video conferencing service 60, and the endpoint 70.

To participate in a videoconference, the videoconferencing unit 20 must be capable of communicating with the endpoint 70 via the local network 30, firewall 40, and the Internet 50. To establish the videoconference connection, the videoconferencing unit 20 must uses a network adapter (not shown), traverse the NAT/Firewall arrangement 40, and connect to the videoconferencing service 60, which in turn connects with the remote endpoint 70. Typically, the videoconferencing unit 20 has a plurality of network adapters that can be used for various purposes.

In the present embodiment, one of the servers of the videoconferencing service 60 is an open source server 62 capable of handling requests and responses in the STUN protocol. STUN stands for Simple Traversal of User Datagram Protocol (UDP) Through NATs. The videoconferencing application on the videoconferencing unit 20 can use the STUN protocol to discover the various NATs and firewalls positioned between it and the Internet 50 and to determine the Internet Protocol (IP) addresses allocated to the videoconferencing unit 20 by the various NATs.

Figure 2:
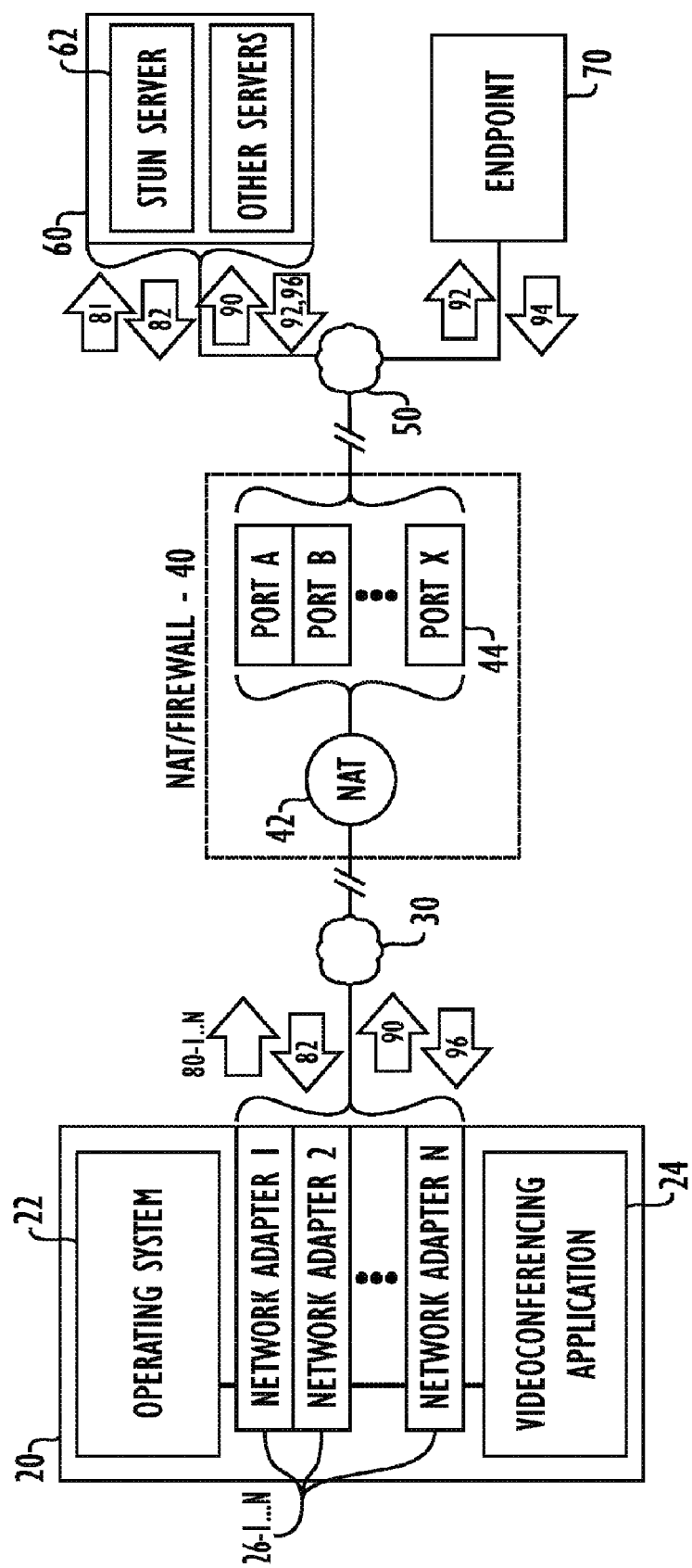
FIG. 2 illustrates the network adapter detection system of FIG. 1 in schematic detail.

Referring to FIG. 2, the network adapter detection system 10 of FIG. 1 is schematically illustrated to show additional details. The videoconference unit 20 has an operating system 22, a videoconferencing application 24, and a plurality of network adapters 26-1 ... N. If a user at the videoconferencing unit 20 wishes to initiate a videoconference, information is first obtained about the plurality of network adapters 26-1 ... N available to the videoconferencing application 24. Typically, the operating system 22 enumerates a list of the available network adapters 26-1 ... N that can be used by the various applications of the videoconferencing unit 20. As noted previously, the videoconferencing unit 20 requires that at least one of the network adapters 26-1 ... N be able to establish a connection with the video conferencing service 60 so that the unit 20 can participate in a videoconference with the remote endpoint 70. However, one or more of the network adapters 26-1 ... N may not be capable of establishing any type of network connection for the videoconference application 24. In addition, one or more of the network adapters 26 may not be capable of establishing a connection with the videoconferencing service 60 that would allow for the exchange of multimedia (voice, video, and data) between the videoconferencing unit 20 and the remote endpoint 70.

During operation, the videoconference unit 20 or an associated network component (e.g., videoconferencing server (See FIG. 3)) operates as a STUN client to generate STUN requests. The open source server 62 of the videoconferencing service 60 operates as a STUN server to receive STUN requests and return STUN responses over the Internet 50. The videoconferencing unit 20 can use the STUN requests and responses to determine which of the network adapters 26-1 ... N can be used by the videoconferencing application 24 to establish a videoconferencing connection with the remote endpoint 70 via the videoconferencing service 60. In addition, the videoconferencing application 24 can use the STUN requests and responses to discover the various NATs 42 and ports 44 of the NAT/firewall arrangement 40 positioned between the application 24 and the Internet 50 and to determine the Internet Protocol (IP) addresses allocated to the application 24 by the NATs 42.

Knowing the available network adapters 26-1 ... N, the videoconferencing application 24 then sends test probe messages 80-1 ... N to the remote STUN server 62 using each of the available network adapters 26-1 ... N. The test probe messages 80-1 ... N includes one or more packets in the STUN protocol. The STUN packets for the messages 80-1 ... N may be used primarily to determine if a communication sent by the videoconferencing unit 20 reaches the open source STUN server 62. In one embodiment, therefore, the STUN packet for the messages 80-1 ... N can be loosely formed and need not implement many of the features available with the STUN protocol. After sending the test probe messages 80-1 ... N, the videoconferencing application 24 determines which of the available network adapters 26-1 ... N to use for a videoconference connection based at least on whether a response to a given test probe message 80-1 ... N sent through one of the adapters 80-1 ... N is returned by the open source STUN server 62.

For example, the operating system 22 may list the network adapters 26-1 ... N of the videoconference unit 20 in a preferred order according to the operating system's standard techniques. For a first of the listed network adapters (e.g., 26-1), the videoconferencing application 24 configures a test probe message 80-1 in the STUN protocol and sends the test probe message 80-1 to the open source STUN server 62 using the first network adapter 26-1. Once the message 80-1 is sent, the videoconferencing unit 20 awaits a response to the test probe message 80-1 from the open source STUN server 62.

If the first network adapter 26-1 is not capable of establishing a network connection for any number of reasons, the test probe message 80-1 will fail to reach the open source STUN server 62. For example, the network adapter 26-1 may be available and enumerated by the operation system 22, but that network adapter 26-1 may simply not be connected to any network (e.g., local network 30). If, one the other hand, the network adapter 26-1 can establish a network connection, the test probe message 80-1 may fail to reach the STUN server 62 for other reasons. For example, the NAT/Firewall arrangement 40, which protects the local network 30 by controlling data traffic from outside the network 30, may prevent a successful connection. The NAT/firewall arrangement 40 has a plurality of ports 44 configured for various purposes. One of these ports 44 must be open and must be assignable to the videoconferencing unit 20. Some examples of firewall ports 44 associated with videoconferencing are shown in TABLE 1 below.

TABLE 1

Example Firewall Ports

| Port No. | Protocol | Description |
| --- | --- | --- |
| Port 389 | (TCP) | For ILS registration |
| Port 1503 | (TCP) | Microsoft NetMeeting T.120 data sharing |
| Port 1718 | (UDP) | Gatekeeper discovery |
| Port 1719 | (UDP) | Gatekeeper RAS (Must be bi-directional) |
| Port 1720 | (TCP) | H.323 Call setup (Must be bi-directional) |
| Port 1731 | (TCP) | Audio call control (Must be bi-directional) |
| Ports 3230-3235 | (TCP/UDP) | Signaling and control for audio, call, video and data/FECC |
| Port 3603 | (TCP) | ViaVideo Web interface (ViaVideo users only) |

Eventually, one of the test probe messages (e.g., 81) sent by one of the network adapters 26-1 ... N may reach the open source STUN server 62. This test probe message 81 has traversed the NAT/firewall arrangement 40 between the videoconferencing unit 20 and the STUN server 62. In traversing the arrangement 40, the test probe message 81 has been translated and mapped by the NATs 42 and has been allocated a port 44. In a typical NAT/firewall arrangement 40, the NATs 42 map and translate localized IP address for devices connected to the local network 30 to external IP addresses accessible by external devices.

After receiving the message 81, the STUN server 62 configures a response 82 in the STUN protocol and returns the response 82 to the videoconferencing unit 20. The response 82 is configured to pass through the NAT/firewall arrangement 40 according to standard operating procedures associated with the NAT/firewall arrangement 40. For example, depending on the level of security, the response 82 may need to be assigned to the same firewall port 44 and addressed to the same external IP address provided by the NATs 42 in the initial message 81. Ultimately, this response 82 will be received by the videoconferencing unit 20 with the same network adapter 26-1 . . . N that was used to send the successful message 81.

It is possible that none of the network adapters 26-1 . . . N receive a successful response 82. In this case, the videoconferencing application 24 will experience an error, and the user may manually need to configure the system 10, e.g., adapters 26-1 . . . N, network 30, and/or NAT/Firewall arrangement 40. It is possible that only one of the network adapters 26-1 . . . N receives a successful response 82. In this case, the videoconferencing application 24 can select or designate that network adapter 26-1 . . . N for use. It is also possible that more than one of the network adapters 26-1 . . . N receives a successful response 82. In this case, the videoconferencing application 24 may automatically select or designate which of the successful network adapters 26-1 . . . N to use based on the response times measured from when the test probe messages 80-1 . . . N were sent from their respective adapter 26-1 . . . N to when the successful responses 82 were received by the respective adapter 26-1 . . . N.

In any event, the videoconferencing application 24 can establish a videoconference connection with the remote endpoint 70 using the designated network adapter 26-1 . . . N that received a successful response 82 from the open source STUN server 62. For example, the videoconferencing application 24 can use the designated network adapter 26-1 . . . N to send videoconferencing packets 90 to the videoconferencing service 60, which are then routed to the endpoint 70 as routed packets 92. In addition, the videoconferencing application 24 can use the designated network adapter 26-1 . . . N to receive videoconferencing packets 96 from the videoconferencing service 60, which are routed from packets 94 from the endpoint 70.

In the embodiment disclosed herein, the test probe messages 80-1 . . . N and responses 82 have been described as using the STUN protocol. However, other protocols can also be used. For example, in one embodiment, Network Time Protocol can be used for the test probe messages 80-1 . . . N and responses 82 to determine which network adapter 26-1 . . . N to use for videoconferencing or other service.

In addition to determining which network adapter 26-1 . . . N to use for videoconferencing or other service, the test probe messages 80-1 . . . N and any received responses 82 can be used for diagnostic purposes. For example, if a test probe message 80-1 . . . N fails, diagnostic information about the failure can be used to assess why the message 80-1 . . . N may have failed. For instance, diagnostic information may indicate that the user must reconfigure the security measures and accessibility of ports 44 associated with the NAT/Firewall arrangement 40. In another example, if multiple test probe messages 80-1 . . . N are successful through different routers, diagnostic information may indicate which of the routers is less restrictive to videoconferencing connections. The less restrictive router can then be used during videoconferences to ensure that multimedia data can be successfully exchanged.

In addition to determining which network adapter 26-1 . . . N to use for videoconferencing or other service, the network adapter detection system 10 can take advantage of some of additional features available with the STUN protocol. For example, the test probe messages 80-1 . . . B can be binding requests in the STUN protocol used to discover any public IP address and port mappings generated by the NATs 42. In some implementations, the videoconferencing unit 20 may have an internal IP address for the local network 30. For security and other reasons, however, the videoconferencing unit 20 and other components of the local network 30 are represented by only a single or a limited number of shared IP addresses with respect to devices external to the NAT/firewall arrangement 40. When the videoconferencing unit 20 is used to connect to an external device (e.g., videoconferencing service 60), the NATs 42 assign a port 44 of the shared IP address for the videoconferencing unit 20. The assignment of the port 44 may be temporary and may be discarded when the connection is terminated. This information may be useful in reconfiguring the system 10 in the event that network adapter detection fails.

In another example, the test probe messages 80-1 . . . B can be binding requests in the STUN protocol used to discover the presence and type of NATs 42 that the videoconferencing application 24 is behind. The NATs 42 can be full cone, restricted cone, port restricted cone, or symmetric cone. For the full cone, internal IP addresses and ports of the local network 30 are mapped to the same external IP address and port. Furthermore, any external host (e.g., videoconferencing server 60 and endpoint 70) can send a packet to the application 24, by sending a packet to the mapped external address. For the restricted cone, all packets from the same internal IP address and port of the local network 30 are mapped to the same external IP address and port, and an external host (e.g., videoconferencing server 60 and endpoint 70) can send a packet to the application 24 only if the application 24 had previously sent a packet to the IP address of the external host. For the port restricted cone, an external host (e.g., videoconferencing server 60 and endpoint 70) can send a packet having a source IP address and a source port to the application 24 only if the application 24 had previously sent a packet to that IP address and port. In the symmetric cone, all packets from the same internal IP address and port of the local network 30 made to a specific destination IP address and port of an external host (e.g., videoconferencing server 60 and endpoint 70) are mapped to the same external IP address and port. Information on the presence and type of NATs 42 between the application 24 and external hosts (e.g., videoconferencing server 60 and endpoint 70) may be useful in reconfiguring the system 10 in the event that network adapter detection fails.

In addition, features of the STUN protocol can be used to have a response 82 from the STUN server 62 sent to a different IP address and port than the one used in initial request 81. This attribute can be used to determine whether the videoconferencing application 24 is behind a firewall. In addition, this attribute can be used to test potential for successful videoconferencing because the videoconferencing application 24 may have separate control and data communications that need to be sent through different ports. Various other features available with the STUN protocol are disclosed in the Request for Comments 3489 from the Network Working Group dated March 2003, which is incorporated herein by reference.

Figure 3:
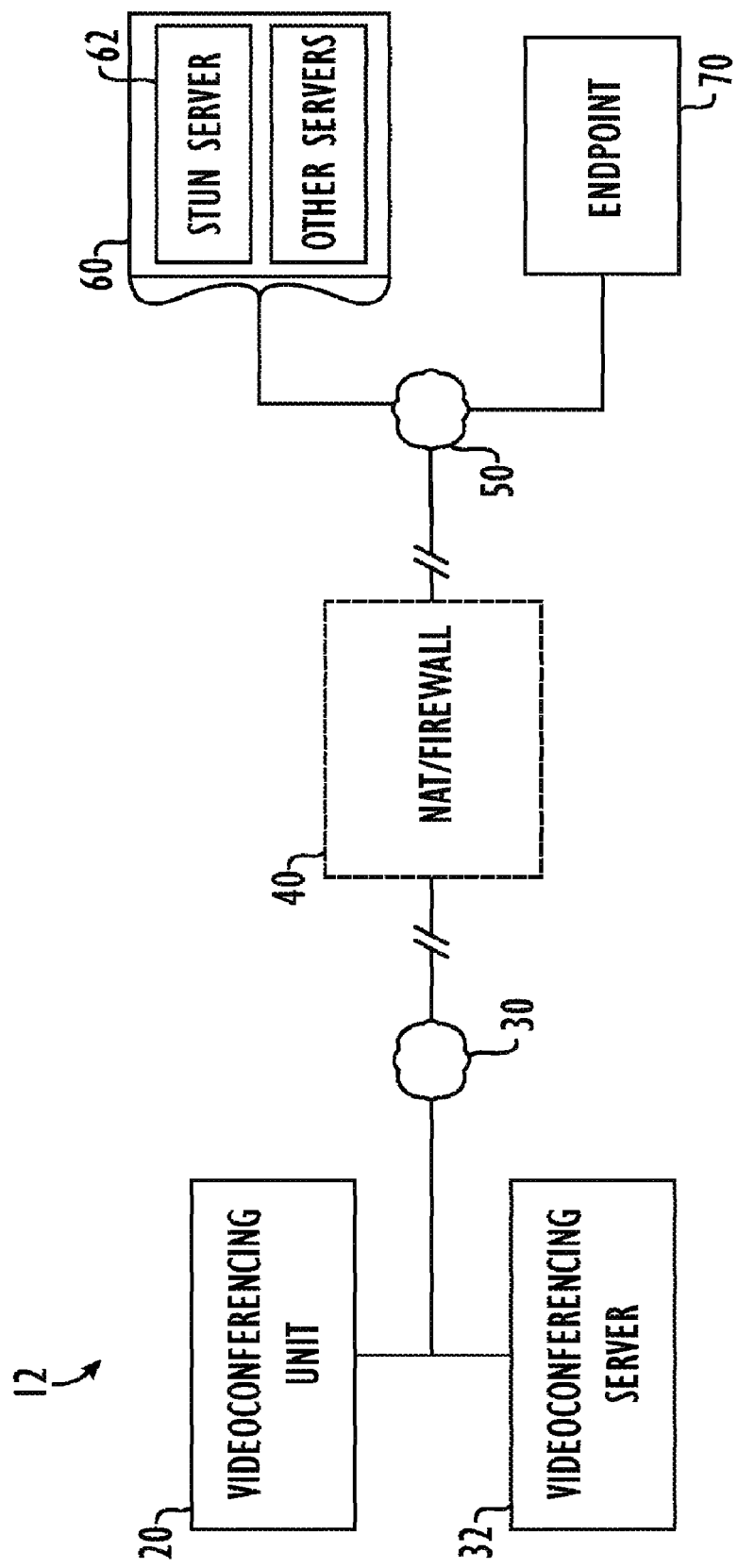
FIG. 3 illustrates an alternative network adapter detection system according to certain teachings of the present disclosure.

In FIG. 3, an alternative network adapter detection system 12 is schematically shown. As opposed to the system in FIG.

2 that has at least one processing unit (e.g., videoconferencing unit 20) for handling requests and responses for network adapter detection, this embodiment of the system 12 includes more than one processing unit in the form of the videoconferencing unit 20 and an associated network server 32. This network server 32 can be a videoconferencing server of the local network 30. Operation in this embodiment of the system 12 is similar to that discussed previously so that like components have the same reference numerals.

In the embodiment of FIG. 3, the videoconferencing unit and/or the associated network server 32 can operate as a STUN client to generate STUN requests. Therefore, according to the techniques disclosed above, the network server 32 can be the processing unit responsible for configuring test messages, binding requests in the STUN protocol, and configuring the test messages such that receipt of any responses to the test messages is made using a different IP address or port.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconferencing network adapter detection method, comprising:
    obtaining information about one or more network adapters available to a videoconferencing application executing at a local endpoint coupleable to a network;
    sending at least one test message for each of the one or more of the network adapters via the network to at least one remote server associated with a videoconferencing service;
    awaiting a response to each of the test messages from the at least one remote server; and
    establishing a videoconference connection between the local endpoint and a remote endpoint via the videoconferencing service if one or more responses are received by using a given one of the network adapters receiving one of the responses from the at least one server.

2. The method of claim 1, wherein obtaining information about one or more network adapters comprises receiving the information from an operating system executing in conjunction with the videoconferencing application.

3. The method of claim 1, wherein the at least one remote server associated with the videoconferencing service comprises an open source server receiving messages in Simple Traversal of User Datagram Protocol Through Network Address Translators (STUN) protocol and sending responses in the STUN protocol via the Internet.

4. The method of claim 1, wherein using the given one of the network adapters receiving the response from the at least one remote server comprises using the given one of the network adapters having a fastest response time.

5. The method of claim 1, wherein sending the one or more test messages comprises sending the one or more test messages from the local endpoint or from a network server associated with the local endpoint.

6. The method of claim 1, wherein sending the one or more test messages comprises sending the one or more test messages in Network Time protocol.

7. The method of claim 1, wherein sending the one or more test messages comprises sending the one or more test messages in Simple Traversal of User Datagram Protocol Through Network Address Translators (STUN) protocol.

8. The method of claim 7, wherein sending the one or more test messages in STUN protocol comprises sending a binding request in the STUN protocol, and wherein the method further comprises discovering information about a Network Address Translator based on a result from the binding request.

9. The method of claim 8, wherein discovering information about the Network Address Translator comprises determining whether the Network Address Translator is full cone, restricted cone, port restricted cone, or symmetric cone.

10. The method of claim 7, wherein sending the one or more test messages in STUN protocol comprises configuring receipt of one or more responses for the one or more test messages at a different Internet Protocol address and port than used to send the one or more test messages.

11. The method of claim 10, wherein the method comprises determining whether the videoconferencing application is behind a firewall based on the one or more responses received at the different Internet Protocol address and port.

12. The method of claim 10, wherein the method comprises determining whether data and control communications for videoconferencing are possible with the videoconferencing application based on the one or more responses received at the different Internet Protocol address and port.

13. The method of claim 1, further comprising:
    determining diagnostic information from a given one of the test messages that failed to generate a response, and
    reconfiguring network security or port accessibility for the videoconferencing application using the diagnostic information.

14. The method of claim 1, further comprising:
    determining diagnostic information from the one or more test messages for which a response is received, and
    determining which router of a network is less restrictive than others using the diagnostic information.

15. A program storage device, readable by a programmable control device, comprising instructions stored on the program storage device for causing the programmable control device to perform a method according to claim 1.

16. A videoconferencing system, comprising:
    a plurality of network adapters communicatively coupleable to a network, the network connectable to at least one remote server associated with a videoconferencing service via one or more Network Address Translators and via one or more ports;
    at least one processing unit communicatively coupleable to the network adapters and executing a videoconferencing application, the at least one processing unit sending a test message for each of the network adapters to the at least one remote server associated with the videoconferencing service and awaiting a response from the at least one remote server for each of the test messages, the at least one processing unit determining which of the network adapters produces a corresponding response from the at least one remote server and establishing a videoconference connection between the videoconferencing application and a remote endpoint via the videoconferencing service using a given one of the network adapters receiving the corresponding response.

17. The system of claim 16, wherein the at least one processing unit uses the given one of the network adapters having a fastest response time.

18. The system of claim 16, wherein the test messages comprise Simple Traversal of User Datagram Protocol Through Network Address Translators (STUN) protocol, and wherein the at least one remote server associated with the videoconferencing service comprises an open source server receiving messages in STUN protocol and sending responses in the STUN protocol via the Internet.

19. The system of claim 18, wherein the test messages comprise a binding request in the STUN protocol, and wherein the at least one processor discovers information about the one or more Network Address Translators based on a result from the binding request.

20. The system of claim 19, wherein the at least one processing unit determines whether the one or more Network Address Translators are full cone, restricted cone, port restricted cone, or symmetric cone.

21. The system of claim 18, wherein to send the test messages in STUN protocol, the at least one processing unit configures receipt of responses to the test messages at a different Internet Protocol address and port than used to send the test messages.

22. The system of claim 21, wherein the at least one processing unit determines whether the videoconferencing application is behind a firewall based on the responses received at the different Internet Protocol address and port.

23. The system of claim 21, wherein at least one processing unit determines whether data and control communications for videoconferencing are possible with the videoconferencing application based on the responses received at the different Internet Protocol address and port.

24. The system of claim 16, wherein the at least one processing unit determines diagnostic information from a given one of the test messages that failed to generate a response, and wherein the diagnostic information is used to reconfigure network security or port accessibility for the videoconferencing application.

25. The system of claim 16, wherein the at least one processing unit determines diagnostic information from the test messages for which a response is received and determines which router of a network is less restrictive than others based on the diagnostic information.

* * * * *